United States Patent
Lee et al.

(10) Patent No.: US 9,379,367 B2
(45) Date of Patent: Jun. 28, 2016

(54) STACKING TYPE BATTERY PACK HAVING CONNECTING MEMBER MADE OF DIFFERENT METALS

(71) Applicant: LG CHEM, LTD., Seoul (KR)

(72) Inventors: BumHyun Lee, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 54 days.

(21) Appl. No.: 14/446,645

(22) Filed: Jul. 30, 2014

(65) Prior Publication Data

US 2015/0037650 A1 Feb. 5, 2015

(30) Foreign Application Priority Data

Jul. 31, 2013 (KR) .................. 10-2013-0090813

(51) Int. Cl.
| | |
|---|---|
| *H01M 2/24* | (2006.01) |
| *H01M 6/42* | (2006.01) |
| *H01M 2/10* | (2006.01) |
| *H01M 2/20* | (2006.01) |
| *H01M 2/34* | (2006.01) |

(52) U.S. Cl.
CPC ............ *H01M 2/1077* (2013.01); *H01M 2/206* (2013.01); *H01M 2/34* (2013.01); *H01M 2220/10* (2013.01); *H01M 2220/20* (2013.01)

(58) Field of Classification Search
CPC ............ H01M 2/24; H01M 2/26; H01M 4/13
USPC .................................................. 429/160, 158
See application file for complete search history.

(56) References Cited

U.S. PATENT DOCUMENTS

| | | | |
|---|---|---|---|
| 2009/0123830 A1 | 5/2009 | Kato et al. | |
| 2009/0305126 A1 | 12/2009 | Choi et al. | |
| 2010/0247997 A1 | 9/2010 | Hostler et al. | |
| 2011/0081568 A1 | 4/2011 | Kim et al. | |
| 2011/0293995 A1* | 12/2011 | Sasaki | H01M 2/202 429/158 |
| 2012/0315807 A1* | 12/2012 | Sakae | H01M 2/206 439/887 |
| 2013/0136974 A1 | 5/2013 | Lim et al. | |
| 2014/0065467 A1 | 3/2014 | Choi et al. | |

FOREIGN PATENT DOCUMENTS

| | | |
|---|---|---|
| KR | 10-2008-0022129 A | 3/2008 |
| KR | 10-2013-0060420 A | 6/2013 |
| KR | 10-2013-0067714 A | 6/2013 |
| KR | 10-2013-0080023 A | 7/2013 |
| WO | WO 2013/051012 A2 | 4/2013 |

* cited by examiner

*Primary Examiner* — Patrick Ryan
*Assistant Examiner* — Julian Anthony
(74) *Attorney, Agent, or Firm* — Birch, Stewart, Kolasch & Birch, LLP

(57) ABSTRACT

Disclosed herein is a battery pack including two or more battery modules connected to each other, external input and output terminals being formed at one side of each of the battery modules, each of the battery modules including a plurality of unit cells electrically connected to each other while being stacked, wherein the two or more battery modules are connected in series or in parallel to each other via a connection member such that one of the battery modules is connected to an adjacent one of the battery modules, and the connection member is configured to have a structure in which different kinds of metals having different melting points are coupled to each other.

13 Claims, 4 Drawing Sheets

10

110

STACKING TYPE BATTERY PACK HAVING CONNECTING MEMBER MADE OF DIFFERENT METALS

TECHNICAL FIELD

The present invention relates to a battery pack including a battery module connection member made of different kinds of metals and, more particularly, to a battery pack including two or more battery modules connected to each other, external input and output terminals being formed at one side of each of the battery modules, each of the battery modules including a plurality of unit cells electrically connected to each other while being stacked, wherein the two or more battery modules are connected in series or in parallel to each other via a connection member such that one of the battery modules is connected to an adjacent one of the battery modules, and the connection member is configured to have a structure in which different kinds of metals having different melting points are coupled to each other.

BACKGROUND ART

Recently, a secondary battery, which can be charged and discharged, has been widely used as an energy source for wireless mobile devices. In addition, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

In addition, technology related to a power storage device that stores electric power and stably supplies the stored electric power to a power system when needed has been developed. The power storage device is a device that stores electric power when power demand is low and supplies the stored electric power in case of overload or emergency. The power storage device provides the effect of improving quality of electric power and energy efficiency. In particular, a market for a household power storage device and a middle-sized industrial or commercial power storage device has been rapidly expanding as the power storage devices are related to smart grid technology.

Meanwhile, for a battery pack to provide output and capacity required by a predetermined apparatus or device, it is necessary for the battery pack to be configured to have a structure in which a plurality of unit cells or a plurality of battery modules, each of which includes a plurality of unit cells, is electrically connected to each other in series or in parallel. In addition, it is necessary for the battery pack to be configured to have a structure which is easily extendable and stable as the capacity of the battery pack is increased.

Particularly, in a case in which a plurality of battery modules is used to constitute the battery pack, a plurality of members, such as bus bars or power connection cables, for mechanical fastening and electrical connection between the battery modules is generally needed and, as a result, a process of assembling such members is very complicated. Furthermore, in a case in which it is necessary to extend the battery pack, it is difficult to modify the structure of the battery pack and it is necessary to add a plurality of parts, thereby increasing manufacturing cost.

In addition, the battery pack is configured to have a structure in which a plurality of battery modules is combined. In a case in which overvoltage is applied to some of the battery modules, overcurrent flows in some of the battery modules, or some of the battery modules overheat, therefore, safety and operation efficiency of the battery pack are seriously concerned. For this reason, it is necessary to provide a safety system, such as a battery management system (BMS), which detects such overvoltage, overcurrent, or the overheating to interrupt the flow of electric current in the battery pack or operate a cooling device. However, the provision of several sensors and a plurality of wires as well as the BMS increases manufacturing cost and complicates the manufacturing process.

Consequently, there is a high necessity of technology related to a structure that is capable of improving safety of the battery pack during abnormal operation of the battery pack through simple addition or change of parts.

DISCLOSURE

Technical Problem

Therefore, the present invention has been made to solve the above problems, and other technical problems that have yet to be resolved.

It is an object of the present invention to provide a battery pack configured to have a structure that interrupts the flow of electric current between battery modules constituting the battery pack to achieve suspension of power supply when temperature of the battery pack is increased due to abnormal operation, such as overcharge, overdischarge, or overcurrent, of the battery pack or deterioration of the battery pack caused by charge and discharge of the battery pack for a long period of time, thereby improving safety of the battery pack.

It is another object of the present invention to provide a battery pack configured to have a structure that simply interrupts the flow of electric current in the battery pack without using a plurality of members when temperature of the battery pack is increased, thereby reducing manufacturing cost and improving structural stability and manufacturing processability of battery pack while configuring the battery pack to have a compact structure.

Technical Solution

In accordance with one aspect of the present invention, the above and other objects can be accomplished by the provision of a battery pack including two or more battery modules connected to each other, external input and output terminals being formed at one side of each of the battery modules, each of the battery modules including a plurality of unit cells electrically connected to each other while being stacked, wherein the two or more battery modules are connected in series or in parallel to each other via a connection member such that one of the battery modules is connected to an adjacent one of the battery modules, and the connection member is configured to have a structure in which different kinds of metals having different melting points are coupled to each other.

That is, the battery pack according to the present invention is configured to have a structure in which temperature of the connection member is increased due to instantaneously high electric current flowing in the battery pack when a short circuit occurs in the battery pack in an abnormal state of the battery modules with the result that one of the metals having a relatively low melting point is melted first and thus the connection member is cut. Consequently, it is possible to secure safety of the battery pack when a short circuit occurs in the battery pack.

A conventional battery pack is configured to have a structure in which the flow of electric current flowing in the battery pack is interrupted using a fuse, etc. when temperature of the battery pack is high. In this case, however, it is necessary to provide an additional fuse installation space, which leads to addition of corresponding parts. Consequently, the above structure is not preferable in terms of space and cost. In the battery pack according to the present invention, on the other hand, it is possible to simply secure safety of the battery pack when a short circuit occurs in the battery pack through the use of the connection member configured to have a structure in which different kinds of metals having different melting points are coupled to each other. In addition, modification in structure of the battery pack, addition of parts, or provision of an additional installation space due to addition of the safety device is not needed, thereby reducing manufacturing cost and improving productivity.

Furthermore, it is possible to provide a battery pack having a compact structure exhibiting high stability.

In a concrete example, the connection member may include a first connection part and a second connection part coupled to the external input and output terminals of the battery modules to be electrically connected to each other. That is, the connection member may be manufactured to have a structure in which the first connection part and the second connection part are coupled to each other.

The first connection part and the second connection part may be made of different kinds of plate-shaped metal members. The first connection part and the second connection part may be coupled to each other using various methods, such as laser welding and resistance welding. The plate-shaped first connection part and the plate-shaped second connection part may be coupled to each other in a state in which one end of the first connection part is in contact with one end of the second connection part. According to circumstances, the plate-shaped first connection part and the plate-shaped second connection part may be coupled to each other in a state in which one end of the first connection part and one end of the second connection part overlap each other. In this case, the first connection part and the second connection part may be coupled to each other to have a clad metal structure formed by rolling.

Meanwhile, the sectional area of a coupling region between the first connection part and the second connection part may be smaller than the sectional area of the first connection part and the sectional area of the second connection part such that the first connection part and the second connection part can be easily separated from each other in a state in which temperature of the battery pack is high.

Specifically, the coupling region between the first connection part and the second connection part may be provided with at least one through hole or a notch to reduce the sectional area of the coupling region between the first connection part and the second connection part.

The materials for the first connection part and the second connection part are not particularly restricted so long as the first connection part and the second connection part are made of electrically conductive metals having different melting points. For example, the first connection part may be made of copper and the second connection part may be made of aluminum. When temperature of the connection member exceeds a melting point of aluminum, therefore, the second connection part made of aluminum is melted and thus separated from the first connection part made of copper. As a result, the connection member is cut.

In a concrete example, each of the unit cells may be configured to have a plate-shaped battery cell structure or a cell assembly structure in which two or more plate-shaped battery cells are mounted in a cell cover in a state in which electrode terminals of the battery cells are exposed.

The plate-shaped battery cell may be, for example, a prismatic secondary battery or a pouch-shaped secondary battery. The prismatic secondary battery may be configured to have a structure in which an electrode assembly is mounted in a prismatic metal case in a sealed state and the pouch-shaped secondary battery may be configured to have a structure in which an electrode assembly is mounted in a laminate sheet including a resin layer and a metal layer in a sealed state.

The battery cell is not particularly restricted so long as the battery cell provides high voltage and current when a battery module or a battery pack is constructed. For example, the battery cell may be a lithium secondary battery having a large storage quantity of energy per volume.

In a cell assembly, which is another example of the unit cell, the cell cover may include a pair of sheathing members coupled to each other to surround outer surfaces of the battery cells excluding the electrode terminals. For example, two battery cells may be mounted in the cell cover and the two battery cells may be stacked such that electrode terminals having the same polarities are connected in parallel to each other while being adjacent to each other.

In a concrete example, each of the battery modules may include unit cells each having electrode terminals formed at one side thereof, cartridges to fix the respective unit cells, and bus bars coupled to the electrode terminals to electrically connect the unit cells to each other. In addition, the unit cells may be mounted in the respective cartridges such that the electrode terminals face each other and the electrode terminals may be connected in parallel to each other via parallel connection bus bars mounted at the respective cartridges to constitute a unit cell parallel connection structure in each cartridge. Furthermore, the cartridges may be stacked such that the respective unit cell parallel connection structures are arranged from a ground in a height direction and the parallel connection bus bars between the unit cell parallel connection structures may be connected in series or in parallel to each other.

That is, a plurality of unit cells is connected in parallel to each other to constitute a unit cell parallel connection structure and a plurality of unit cell parallel connection structures is stacked in a state in which the unit cell parallel connection structures are connected in series or in parallel to each other. Consequently, it is possible to easily assemble the battery pack and to extend output or capacity of the battery pack through a simple process.

Meanwhile, the parallel connection bus bars may be connected to the external input and output terminals. Specifically, the external input and output terminals may be electrically connected to the bus bars via electrical connection members.

In accordance with another aspect of the present invention, there is provided a device including the battery pack with the above-stated construction.

Specifically, the device may be a household power supply, a power supply for public facilities, a power supply for large-sized stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

The structures and manufacturing methods of the above-specified devices are well known in the art to which the present invention pertains and thus a detailed description thereof will be omitted.

Effects of the Invention

As is apparent from the above description, the battery pack according to the present invention is configured to have a structure that interrupts the flow of electric current between battery modules constituting the battery pack to achieve suspension of power supply when temperature of the battery pack is increased due to abnormal operation, such as overcharge, overdischarge, or overcurrent, of the battery pack or deterioration of the battery pack caused by charge and discharge of the battery pack for a long period of time, thereby improving safety of the battery pack. In addition, the battery pack according to the present invention is configured to have a structure that simply interrupts the flow of electric current in the battery pack without using a plurality of members when temperature of the battery pack is increased, thereby reducing manufacturing cost and improving structural stability and manufacturing processability of the battery pack while configuring the battery pack to have a compact structure.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
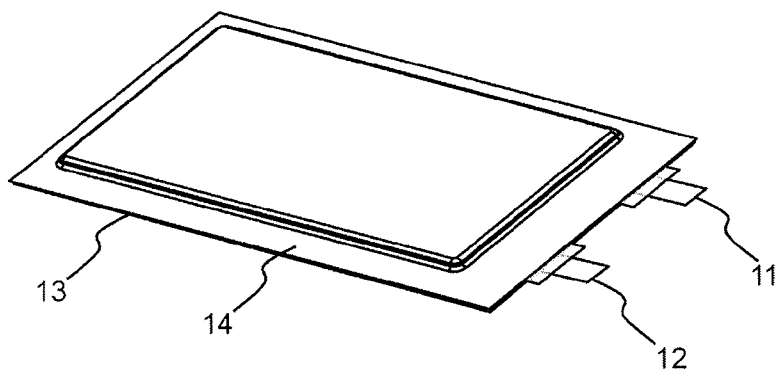
FIG. 1 is a perspective view showing a battery cell constituting a unit cell of a battery module according to the present invention.
Figure 2:
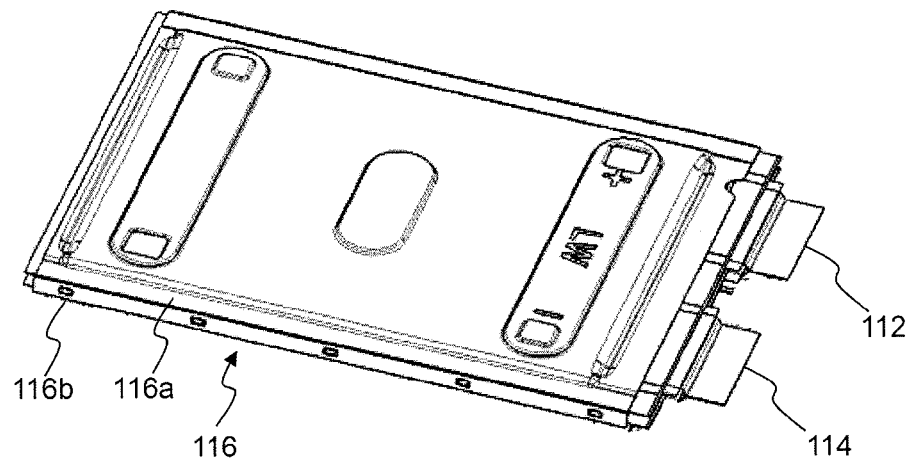
FIG. 2 is a perspective view showing a unit cell configured to have a structure in which battery cells, one of which is shown in FIG. 1, are mounted in a cell cover.

FIG. 1 is a perspective view showing a battery cell constituting a unit cell of a battery module according to the present invention and FIG. 2 is a perspective view showing a unit cell (cell assembly) configured to have a structure in which battery cells, one of which is shown in FIG. 1, are mounted in a cell cover.

Referring to FIGS. 1 and 2, a battery cell 10 is configured to have a plate-shaped structure in which electrode terminals (a cathode terminal 11 and an anode terminal 12) are formed at one end of the battery cell. Specifically, the plate-shaped battery cell 10 is configured to have a structure in which an electrode assembly (not shown) is mounted in a pouch-shaped case 13 made of a laminate sheet including a metal layer (not shown) and a resin layer (not shown) and a sealed portion 14 is formed, for example, by thermal bonding. Generally, the plate-shaped battery cell with the above-stated construction may also be referred to as a pouch-shaped battery cell.

A unit cell 110 is configured to have a structure in which two plate-shaped battery cells are mounted in a cell cover 116 in a state in which electrode terminals 112 and 114 of the battery cells are exposed from one side of the cell cover 116. The cell cover 116 of the unit cell 100 includes a pair of sheathing members 116a and 116b coupled to each other to surround outer surfaces of the battery cells excluding the electrode terminals 112 and 114. The battery cells are mounted in the cell cover 116 such that the battery cells are stacked. The electrode terminals 112 and 114 of the battery cells are exposed outward from the cell cover in a state in which the same electrodes of the battery cells are connected in parallel to each other while being adjacent to each other.

Figure 3:
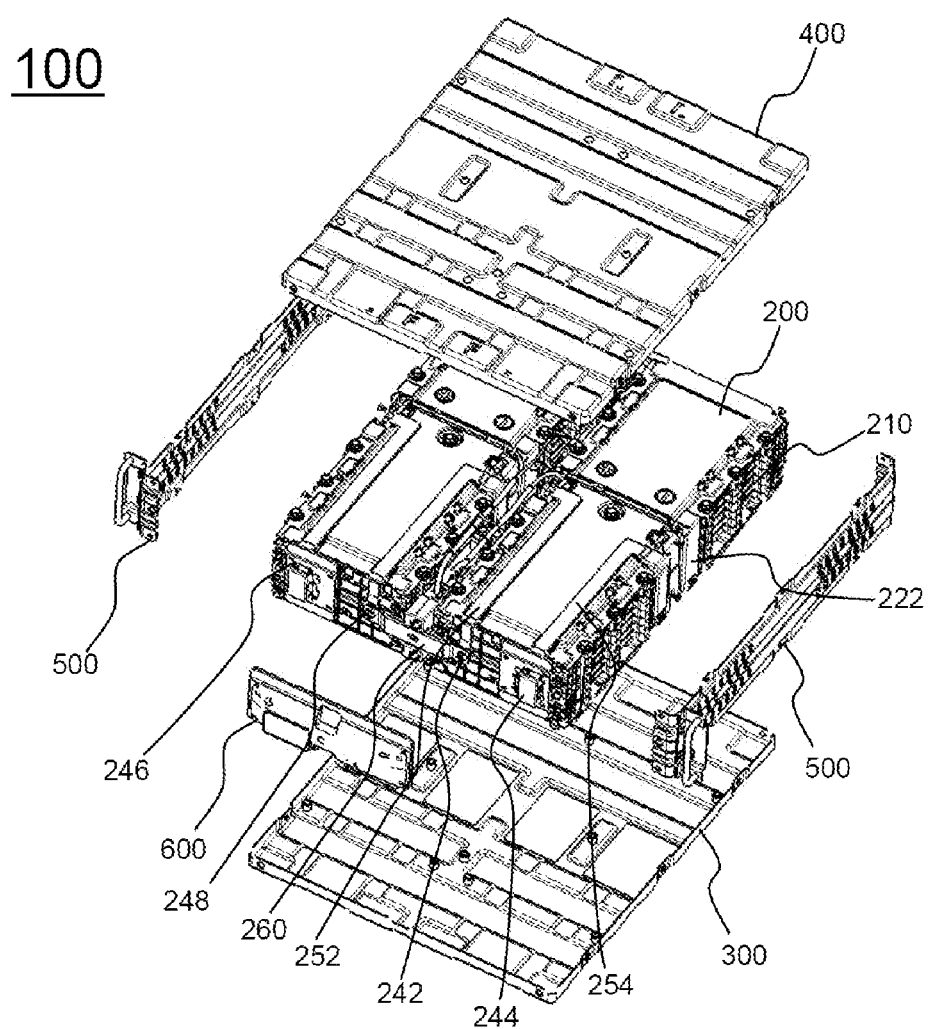
FIG. 3 is an exploded perspective view showing a battery pack according to an embodiment of the present invention.
Figure 4:
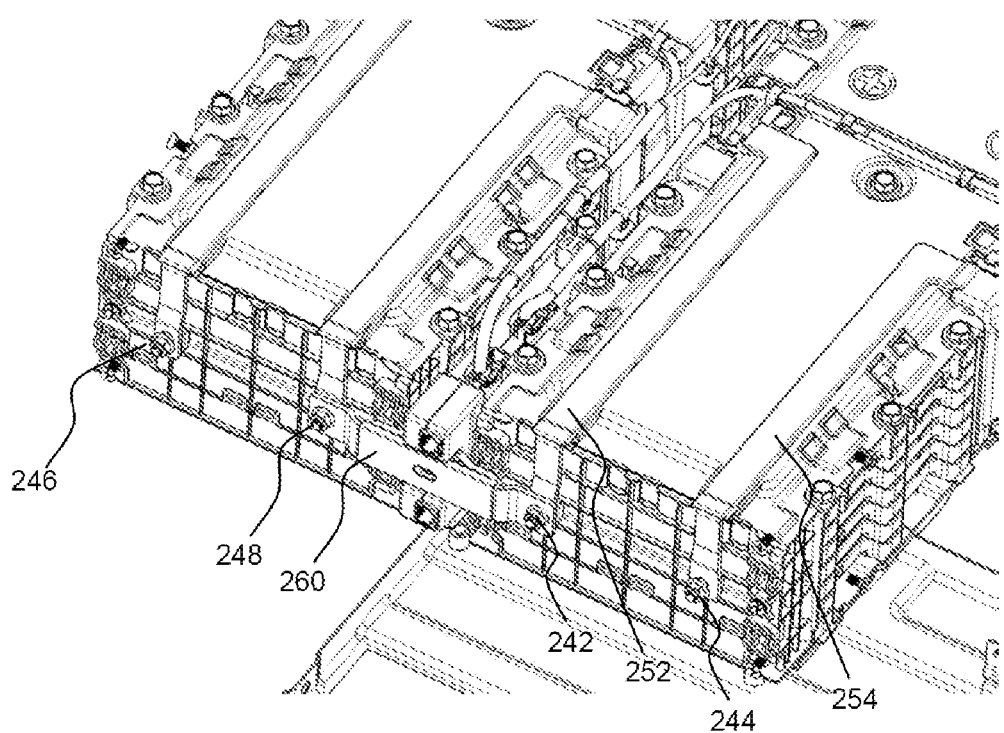
FIG. 4 is an enlarged view showing regions of battery modules shown in FIG. 3 connected by a connection member.

FIG. 3 is an exploded perspective view showing a battery pack according to an embodiment of the present invention and FIG. 4 is an enlarged view showing regions of battery modules shown in FIG. 3 connected by a connection member.

Referring to FIGS. 3 and 4, a battery pack 100 includes two battery modules 200. The battery modules 200 are loaded on a base plate 300. A top plate 400, side plates 500, and a front plate 600 are mounted at the top, the sides, and the front of the battery modules 200 to protect the battery modules 200.

Each battery module 200 includes unit cells each having electrode terminals formed at one side thereof, cartridges 210 to fix the respective unit cells, and bus bars coupled to the electrode terminals to electrically connect the unit cells to each other. At the outside of each bus bar is mounted a bus bar cover 222 to protect the bus bar. External input and output terminals 242 and 248 are formed at one side of each battery module 200. The external input and output terminals 242 and 248 are connected to the bus bars via electrical connection members 252 and 254.

The unit cells are mounted in the respective cartridges 210 such that the electrode terminals face each other. The electrode terminals are connected in parallel to each other via the bus bars mounted at the respective cartridges 210 to constitute a unit cell parallel connection structure in each cartridge 210. The cartridges 210 are stacked such that the unit cell parallel connection structures are arranged from the ground in a height direction. The parallel connection bus bars between the unit cell parallel connection structures are connected in series or in parallel to each other.

The battery modules 200 are connected in series to each other. Such connection is achieved by fastening the external input and output terminals 242 and 248 formed at the outsides of the battery modules 200 to each other using a connection member 260. The connection member 260 is configured to have a structure in which different kinds of metals having different melting points are coupled to each other. When temperature of the battery pack 100 is increased, therefore, a metal having a relatively low melting point is melted first such that the connection member 260 is cut. As a result, the flow of electric current between the battery modules 200 is interrupted.

Figure 5:
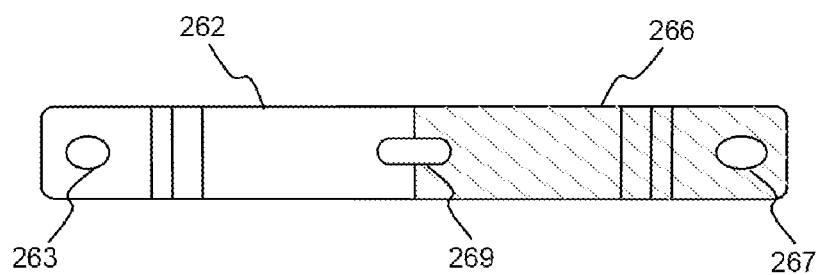
FIG. 5 is a typical view of a connection member shown in FIG. 3.

FIG. 5 is a typical view of the connection member shown in FIG. 3.

Referring to FIG. 5 together with FIG. 3, the connection member 260 is configured to have a structure in which a first connection part 262 and a second connection part 266 made of metals having different melting points are coupled to each other. The first connection part 262 and the second connection part 266 are provided with fastening holes 263 and 267, in which the external input and output terminals 242 and 248 of the battery modules 200 are fastened using bolts (not shown).

In addition, a through hole 269 is formed at a coupling region between the first connection part 262 and the second connection part 266 of the connection member 260. In this structure, the sectional area of the coupling region is reduced such that the first connection part 262 and the second connection part 266 can be easily separated from each other in a state in which temperature of the battery pack 100 is high.

Figure 6:
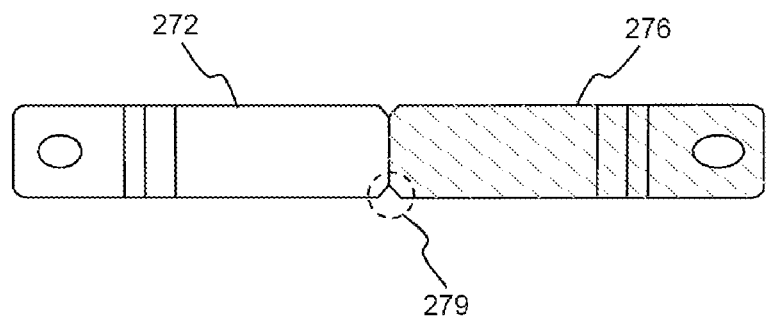
FIG. 6 is a typical view showing a connection member according to another embodiment of the present invention.

FIG. 6 is a typical view showing a connection member configured to have another structure.

Referring to FIG. 6, a connection member 270 has notches 279 formed at opposite sides of a coupling region between a first connection part 272 and a second connection part 276. In this structure, therefore, the sectional area of the coupling region is reduced such that the first connection part 272 and a second connection part 272 can be easily separated from each other in a state in which temperature of the battery pack 100 is high in the same manner as in FIG. 5.

The structure in which the sectional area of the coupling region is reduced is not limited to the structures shown in FIGS. 5 and 6. That is, it is possible to provide various structures in which the sectional area of the coupling region may be reduced. For example, a structure having a plurality of through holes or a structure having through holes and notches may be provided.

Figure 7:
FIG. 7 is a typical view showing a side of the connection member of FIG. 5.
Figure 8:
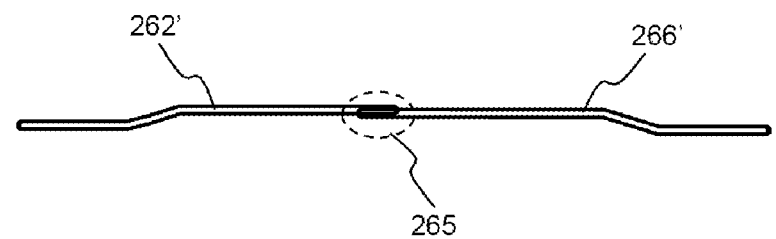
FIG. 8 is a typical view showing a side of a connection member according to a further embodiment of the present invention.

FIG. 7 is a typical view showing a side of the connection member of FIG. 5 and FIG. 8 is a typical view showing a side of a connection member according to a further embodiment of the present invention.

Referring to FIGS. 7 and 8, the first connection part 262 and the second connection part 266 may be coupled to each other in contact as shown in FIG. 7 or a first connection part 262' and a second connection part 266' may be coupled to each other in an overlapping fashion (265) as shown in FIG. 8.

That is, the structure of the coupling region and kinds of metals are not particularly restricted so long as a metal having a relatively low melting point is melted at a predetermined temperature such that the coupling region is cut. The coupling structure as shown in FIG. 7 may be achieved by laser welding or resistance welding and the structure in which corresponding ends of the connection parts overlap each other as shown in FIG. 8 may be constituted by a clad metal structure formed by rolling.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery pack comprising two or more battery modules connected to each other, external input and output terminals being formed at one side of each of the battery modules, each of the battery modules comprising a plurality of unit cells electrically connected to each other while being stacked, wherein the two or more battery modules are connected in series or in parallel to each other via a connection member such that one of the battery modules is connected to an adjacent one of the battery modules, the connection member is configured to have a structure in which different kinds of metals having different melting points are coupled to each other, the connection member comprises a first connection part and a second connection part coupled to the external input and output terminals of the battery modules to be electrically connected to each other, and a sectional area of a coupling region between the first connection part and the second connection part is smaller than a sectional area of the first connection part and a sectional area of the second connection part.

2. The battery pack according to claim 1, wherein the first connection part and the second connection part are made of different kinds of plate-shaped metal members.

3. The battery pack according to claim 1, wherein corresponding ends of the first connection part and the second connection part are coupled to each other to have a clad metal structure formed by rolling.

4. The battery pack according to claim 1, wherein the coupling region between the first connection part and the second connection part is provided with at least one through hole to reduce the sectional area of the coupling region between the first connection part and the second connection part.

5. The battery pack according to claim 1, wherein the coupling region between the first connection part and the second connection part is provided with a notch to reduce the sectional area of the coupling region between the first connection part and the second connection part.

6. The battery pack according to claim 1, wherein the first connection part is made of copper and the second connection part is made of aluminum.

7. The battery pack according to claim 1, wherein each of the unit cells is configured to have a structure comprising one plate-shaped battery cell or a structure in which two or more plate-shaped battery cells are mounted in a cell cover in a state in which electrode terminals of the battery cells are exposed.

8. The battery pack according to claim 7, wherein the battery cell is a prismatic secondary battery or a pouch-shaped secondary battery.

9. The battery pack according to claim 8, wherein the pouch-shaped secondary battery is configured to have a structure in which an electrode assembly is mounted in a laminate sheet comprising a resin layer and a metal layer in a sealed state.

10. The battery pack according to claim 7, wherein the plate-shaped battery cell is a lithium secondary battery.

11. The battery pack according to claim 7, wherein the cell cover comprises a pair of sheathing members coupled to each other to surround outer surfaces of the battery cells excluding the electrode terminals.

12. A device comprising a battery pack according to claim 1.

13. The device according to claim 12, wherein the device is a household power supply, a power supply for public facilities, a power supply for stores, a power supply for emergency, a power supply for computer rooms, a portable power supply, a power supply for medical facilities, a power supply for fire extinguishing facilities, a power supply for alarm facilities, a power supply for refuge facilities, an electric vehicle, a hybrid electric vehicle, or a plug-in hybrid electric vehicle.

* * * * *